United States Patent
Nielsen et al.

(10) Patent No.: US 7,354,560 B2
(45) Date of Patent: Apr. 8, 2008

(54) PROCESS FOR THE PRODUCTION OF HYDROGEN

(75) Inventors: Poul Erik Højlund Nielsen, Fredensborg (DK); Leif Storgaard, Herlev (DK)

(73) Assignee: Haldor Topsoe A/S, Lyngby (DK)

( * ) Notice: Subject to any disclaimer, the term of this patent is extended or adjusted under 35 U.S.C. 154(b) by 100 days.

(21) Appl. No.: 11/342,623

(22) Filed: Jan. 31, 2006

(65) Prior Publication Data
US 2007/0178034 A1    Aug. 2, 2007

(51) Int. Cl.
C01B 3/02 (2006.01)
C01C 1/00 (2006.01)
C01C 1/02 (2006.01)

(52) U.S. Cl. .............. 423/242.1; 423/230; 423/244.01; 423/244.02; 423/244.06; 423/244.1; 423/650; 423/651; 423/652; 252/373

(58) Field of Classification Search ........... 423/244.02, 423/244.06, 244.1, 242.1, 244.01, 230, 650, 423/651, 652; 252/373
See application file for complete search history.

(56) References Cited

U.S. PATENT DOCUMENTS

| | | | |
|---|---|---|---|
| 1,812,527 A * | 6/1931 | Gross et al. ............. | 423/658.3 |
| 2,074,311 A * | 3/1937 | Moore ...................... | 423/658.3 |
| 3,532,467 A * | 10/1970 | Smith et al. ................ | 423/650 |
| 3,939,250 A * | 2/1976 | Michel et al. .............. | 423/224 |
| 5,547,649 A * | 8/1996 | Beck et al. ................. | 423/230 |
| 5,976,723 A | 11/1999 | Boffito et al. | |
| 2003/0118495 A1* | 6/2003 | Khare et al. ........... | 423/244.01 |

FOREIGN PATENT DOCUMENTS

| | | |
|---|---|---|
| EP | 0 354 623 | 2/1990 |
| WO | WO 01/87770 | 11/2001 |
| WO | WO 02/38704 | 5/2002 |

* cited by examiner

Primary Examiner—Timothy C. Vanoy
(74) Attorney, Agent, or Firm—Dickstein Shapiro LLP

(57) ABSTRACT

Process for the removal of organic and/or inorganic sulfur from an ammonia stream by passing said stream through a fixed bed of sulfur absorbent in a sulfur absorber and withdrawing a sulfur-free ammonia stream, wherein said sulfur absorbent is a catalyst having a total nickel content in reduced form in the range 10 wt % to 70 wt % with the balance being a carrier material selected from the group of alumina, magnesium alumina spinel, silica, titania, magnesia, zirconia and mixtures thereof.

15 Claims, 1 Drawing Sheet

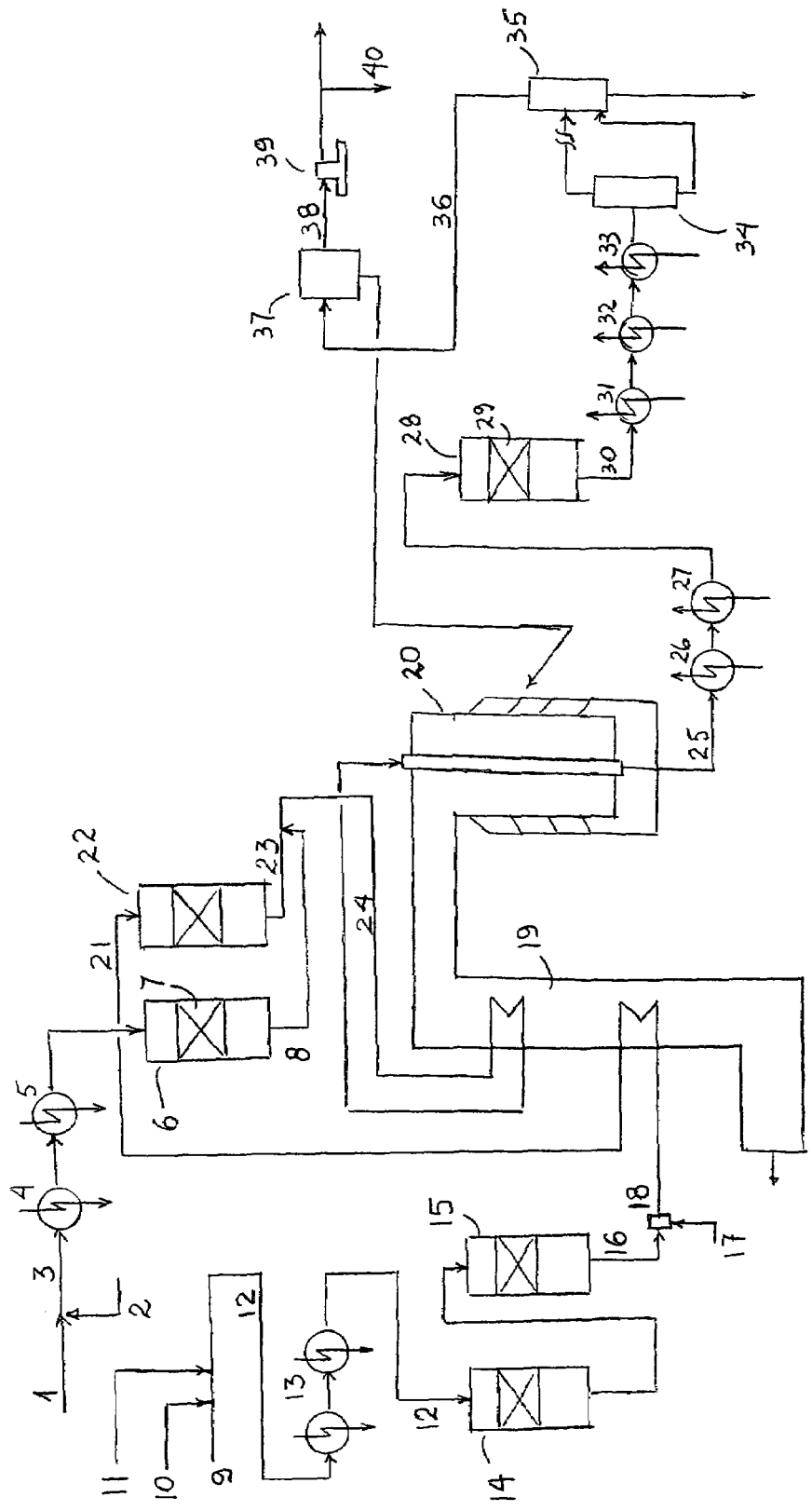

PROCESS FOR THE PRODUCTION OF HYDROGEN

FIELD OF THE INVENTION

This invention relates to the removal of sulfur species from an ammonia stream in which the sulfur-free ammonia stream is used in a subsequent reforming stage in a hydrogen production process. More particularly, the invention relates to the removal of sulfur species from an ammonia stream by retaining the sulfur of the ammonia stream in a nickel containing catalyst such as a methanation catalyst.

BACKGROUND OF THE INVENTION

Hydrogen is an important gas for the operation of a wide range of industrial applications. One particular field of application is oil refineries, where demand for hydrogen is constantly increasing as a direct result of the steady increasing demand on refinery capacity. Refining units used for operations such as hydro-denitrogenation, hydrocracking and dearomatisation require the addition of hydrogen. The hydrogen requirements in these refining units may for instance be met by hydrogen produced in a plant nearby specifically devoted to the refinery needs.

In particular, during hydro-denitrogenation (HDN) hydrogen is added to an oil feedstock stream and is passed over a hydrotreating catalyst in order to convert nitrogen- and sulfur-containing compounds to ammonia and hydrogen sulfide. The effluent from the hydrotreating unit may be passed to a separating vessel, where a gaseous phase containing ammonia and hydrogen sulphide is separated from a liquid phase. The nitrogen- and sulfur-free liquid phase is then be passed over a hydrocracking unit, whereby the risk of poisoning the nitrogen-sensitive hydrocracking catalyst is eliminated. By hydrocracking the liquid phase is converted into lighter products which are of higher value for instance gasoline.

Normally, as generally described in EP-A-0354 623, the ammonia containing stream separated during the HDN stage is simply discharged and subjected to purification and sulfur recovery. In other instances, such as in our WO-A-0238704, ammonia may be added to the liquid phases of the one or more catalyst beds in a hydrocracking unit in order to improve product selectivity and reduce hydrogen consumption.

More generally ammonia is also known as a hydrogen carrier and accordingly it has been suggested to decompose or crack ammonia in order to produce nitrogen and hydrogen. U.S. Pat. No. 5,976,723 describes a method and materials for the cracking of ammonia to produce hydrogen, which is suitable for use in internal combustion engines. WO-A-01/87770 mentions the possibility of autothermally decomposing ammonia to produce hydrogen, where the hydrogen can be used in refinery processes such as hydrocracking, hydrotreating and hydroisomerization.

The utilization of ammonia in connection with reforming and subsequent downstream processes for production of hydrogen from synthesis gas, particularly in larger plants capable of producing up to 120 000 $Nm^3/h$ hydrogen or even more has been precluded due to the often inevitable presence of sulfur in the ammonia stream. Sulfur acts as a poison for downstream catalysts such as nickel-based reforming catalyst as well as water-gas shift catalysts used for the enrichment of the synthesis gas in hydrogen.

It would be desirable to be able to utilize ammonia containing sulfur and which is emitted from chemical processes such as hydro-denitrogenation in oil refineries, as a valuable hydrogen source instead of simply disposing it, as disposal of ammonia requires transportation in specially designed containers and thus it represents a complicated and highly expensive process.

SUMMARY OF THE INVENTION

It is therefore an object of the invention to eliminate the need of discharging or disposing ammonia containing sulfur in catalytic refining processes. In particular, it is an object of the invention to be able to re-utilize the ammonia from a catalytic refining process in a cost-effective manner.

It is another object of the invention to provide for a process that enables the use of sulfur containing ammonia streams in the production of hydrogen.

These and other objects are solved by the present invention.

Accordingly, we provide a process for the removal of organic and/or inorganic sulfur from an ammonia stream by passing said stream through a fixed bed of sulfur absorbent in a sulfur absorber and withdrawing a sulfur-free ammonia stream, wherein said sulfur absorbent is a catalyst having a total nickel content in reduced form in the range 10 wt % to 70 wt % with the balance being a carrier material selected from the group of alumina, magnesium alumina spinel, silica, titania, magnesia, zirconia and mixtures thereof.

As used herein, the term "sulfur-free ammonia stream" defines an ammonia stream having only traces (in the order of ppb) of organic and/or inorganic sulfur.

As used herein, the term "balance" defines the amount of carrier material required to sum up to 100 wt % in the catalyst, i.e. if the total nickel content in reduced form is 10 wt %, the amount of carrier material amounts to 90 wt %.

The catalyst is normally supplied in its reduced form. However, it would be understood that the nickel in the catalyst may also be present partly in reduced form and partly in oxidized form. The term "total nickel content in reduced form" as used herein defines therefore the sum of the nickel in reduced form and the nickel in oxidized form when calculated in its reduced form.

We have surprisingly found that a nickel catalyst as described above is able to remove sulfur in an ammonia-rich atmosphere so as to produce an ammonia stream containing only traces of sulfur by removing both hydrogen sulfide and any organic sulfur present in the ammonia stream. The utilization of otherwise known, more readily available and less inexpensive sulfur absorbents such as cooper oxide and zinc oxide has proved insufficient for removing sulfur in an ammonia-rich atmosphere.

Without being bound by any scientific theory it appears that in an ammonia-rich atmosphere the sulfur is absorbed or chemisorbed on the nickel catalyst as a result of the nickel having a high stability and affinity towards sulfur, as well as a high surface area due to its dispersion throughout the carrier material.

The catalyst has a total nickel content in reduced form in the range 10 to 70 wt %, preferably above 15 or 20 wt % with the balance being alumina as the carrier material. Thus, the total nickel content in reduced form may for example be 20 to 25 wt %, the balance being the content of carrier material, which is preferably alumina. The bulk of the catalyst is in the range 0.5 to 1.2 kg/L, preferably 0.6 kg/L, and is in the form of extruded rings having a size of 4 mm to 8 mm preferably 5 mm.

The catalyst forming the fixed bed of sulfur absorbent may also be provided in other shapes such as cylindrical tablets which may have dimensions 4×4, 5×5 or 6×6 mm or as pellets (spheres), which may have dimensions (diameter) in the range 3 to 7 mm. The catalyst may also be provided as small holed cylinders having size 11×6 mm (diameter× height) and a plurality of holes of about 2 mm in diameter, for example four to eight holes normally seven. Preferably, the catalyst is provided as extruded cylindrical rings having dimensions OD×ID of 5×2.5 mm.

Suitable carrier materials are alumina, magnesium alumina spinel, silica, titania, magnesia zirconia and mixtures thereof. Other suitable carrier materials include cement and calcium compounds such as calcium oxide. Preferably, the carrier material is alumina, as this is the most inexpensive and normally most readily available material. The surface area provided by the carrier material is in the range 50 to 200 $m^2/g$, preferably about 100 $m^2/g$, for instance 80 $m^2/g$. The carrier material enables that the active catalytic component, i.e. nickel is stabilized and dispersed across a large surface area. The catalyst particles forming the fixed bed of sulfur absorbent may be prepared by impregnating original particles in the shape of extrudates, pellets or the like as described above with a nickel-containing solution and then drying, calcining and optionally reducing the catalyst.

The catalyst may be promoted with one or more elements from the lanthanide series (rare earth elements), preferably the oxide of elements selected from the group consisting of cerium (Ce), praseodymium (Pr), neodymium (Nd), promethium (Pm), samarium (Sm) and mixtures thereof. Hence, according to the invention the catalyst may further contain above 3 wt % promoter, in which the promoter is one or more oxides of elements selected from the group consisting of cerium, praseodymium, neodymium, promethium, samarium and mixtures thereof, the catalyst having a total nickel content in reduced form of above 10 wt % with the balance being a carrier material selected from the group of alumina, magnesium alumina spinel, silica, titania, magnesia, zirconia and mixtures thereof. Preferably, the promoted catalyst has a composition of above 20 wt % total nickel in reduced form and above 5 wt % promoter (lanthanide series element or elements) with the balance being alumina as the carrier material.

In a particular embodiment, a suitable catalyst for the removal of sulfur from an ammonia stream may also be prepared by coating a monolith support structure with a slurry of the carrier material, then drying and calcining and finally impregnating with a nickel-containing solution and if desired with a promoter-containing solution. The monolith providing for the support of the carrier material is a honeycomb support structure of ceramic material, metal or metal oxide such as alumina. The invention provides therefore also for a process for the removal of organic and/or inorganic sulfur from an ammonia stream by passing said stream through one or more monoliths adapted to a sulfur absorber, in which said one or more monoliths support a sulfur absorbent and withdrawing a sulfur-free ammonia stream, wherein said sulfur absorbent is a catalyst having a nickel content in oxidized form in the range 10 wt % to 100 wt % with the balance being a carrier material selected from the group of alumina, magnesium alumina spinel, silica, titania, magnesia, zirconia and mixtures thereof.

The catalyst may also be promoted with one or more elements from the lanthanide series (rare earth elements) as described above.

Suitable catalysts capable of removing sulfur in ammonia rich atmospheres include pre-reforming catalysts. It is thus possible to remove organic and/or inorganic sulfur from an ammonia stream by passing said stream through a fixed bed of catalyst in a pre-reforming unit. According to one particular embodiment of the invention the sulfur absorber is a pre-reforming unit and the sulfur absorbent is a pre-reforming catalyst having a total nickel content in reduced form in the range 20 to 30 wt %, alumina content in the range 10 to 15 wt % with the balance being magnesia (magnesium oxide). The catalyst may also be promoted with one or more elements from the lanthanide series (rare earth elements), as described above.

A particularly preferred catalyst is a methanation catalyst in which the total nickel content in reduced form is in the range 10 to 70 wt % with the balance being a carrier material selected from the group of alumina, magnesium alumina spinel, silica, titania, magnesia, zirconia and mixtures thereof. We have found that a methanation catalyst, i.e. a nickel-containing catalyst normally used to obtain very low levels of carbon oxides by the reaction of hydrogen enriched synthesis gas stream containing small amounts of carbon monoxide and carbon dioxide with hydrogen to form water vapor and methane, is particularly suitable for the purification of a sulfur-containing ammonia stream so as to produce an ammonia stream containing only traces of sulfur by removing both hydrogen sulfide and any organic sulfur present in the ammonia stream. A preferred methanation catalyst is a catalyst that has a total nickel content in reduced form of above 20 wt % with the balance being alumina as the carrier material. The methanation catalyst may also be promoted with one or more elements from the lanthanide series (rare earth elements) as described above.

As known in the art of steam reforming and hydrogen production, a synthesis gas after a steam reforming process comprising hydrogen, carbon monoxide and carbon dioxide is further enriched in hydrogen by passing it through a water gas shift conversion step. Even when subjecting the synthesis gas stream to a carbon dioxide removal stage, the synthesis gas will still have small amounts of carbon monoxide, normally up to 0.3 vol %, and small amounts of carbon dioxide up to 0.1 vol %. By methanation the synthesis gas stream is reacted with hydrogen to form water vapor by contacting the synthesis gas with a methanation catalyst such as catalyst having above 20 wt % nickel supported on an alumina carrier material. The methanation reaction is highly exothermic and takes normally place at 250-350° C. with an operating pressure of about 3 MPa. Conventional methanation catalysts comprise nickel as the active catalytic component supported on a carrier such as alumina.

In the process according to the invention the absorption of sulfur is preferably conducted at a temperature in the range 100 to 650° C. and pressure in the range 0.5 to 10 MPa. Preferably, the absorption is conducted in the temperature range 300-500° C. and pressure range 0.5 to 5 MPa.

The presence of water impairs the performance of the catalyst in the sulfur absorber. The ammonia stream is therefore normally a dry stream meaning that the water content is below 1 vol %. However, traces of water are often present which may still impair the performance of the catalyst in the sulfur absorber. Hence, in another embodiment of the process, prior to passing said ammonia stream through the fixed bed of sulfur absorbent, said stream is admixed with a hydrogen stream. The admixing with a hydrogen stream ensures that the nickel surface is not oxidized by traces of water. Preferably, after admixing with hydrogen the molar ratio of hydrogen to ammonia in said ammonia stream is in the range 0.001 to 1, more preferably 0.01 to 0.1.

In yet another embodiment of the invention said ammonia stream containing sulfur is separated from the effluent stream of a hydro-denitrogenation (HDN) unit such as an HDN unit of a catalytic refinery process in close proximity to the process. This enables immediate utilization of the sulfur-containing ammonia stream resulting from the HDN step to produce valuable hydrogen in a cost-effective manner that may subsequently be used in the HDN or other units of the catalytic refinery process.

By the invention we also provide a process for the production of hydrogen comprising:

(i) mixing a sulfur-free ammonia stream obtained by conducting the process of claim 1 or 2 with a hydrocarbon feedstock to form a mixed stream, (ii) passing said mixed stream through a reforming stage and withdrawing a hydrogen-rich synthesis gas, (iii) passing said hydrogen-rich synthesis gas through a water-gas-shift conversion stage for further enrichment in hydrogen and withdrawing an enriched hydrogen stream, (iv) passing said enriched hydrogen stream through a hydrogen purification stage and withdrawing a purified hydrogen product.

The purified hydrogen stream of step (iv) contains at least 99 vol % hydrogen and may be further supplied to a catalytic refinery process for instance to the HDN, hydrocracking or dearomatization. Accordingly, the hydrogen produced in the process may be used to meet the demands of the catalytic refining process.

We have found that by mixing a sulfur-free ammonia stream with a hydrocarbon feedstock, such as a mixture of natural gas and pentane, it is possible to increase the hydrogen content in the resulting synthesis gas from the reforming stage as ammonia acts as hydrogen carrier and therefore also as direct supplier of hydrogen in the process.

The sulfur-free ammonia stream of step (i) is obtained by conducting the process as recited in claim 1 or 2. Alternatively, the sulfur-free ammonia stream of step (i) may also be the result of passing the sulfur containing ammonia stream through one or more monoliths in the sulfur absorber which support the carrier material of the catalyst as described above.

In order to increase the cost-effectiveness of the process for the production of hydrogen it is preferred that said ammonia stream is a stream separated from the effluent of a hydro-denitrogenation (HDN) unit, such as a HDN unit of a catalytic refinery process in close proximity to the process.

In another embodiment of the invention in order to facilitate the reforming of hydrocarbon feedstocks heavier than natural gas, such as naphta or pentane, in the process for the production of hydrogen as recited above the hydrocarbon feedstock of step (i) is passed through an adiabatic pre-reforming stage prior to mixing with said sulfur-free ammonia stream.

Preferably, the reforming stage of step (ii) is selected from the group consisting of: fired steam reforming, autothermal reforming and convection reforming. Most preferably, the steam reforming is conducted by fired steam reforming (tubular reforming). The mixed stream of step (ii) may advantageously be preheated by indirect heat exchanging with flue gas from steam reforming for instance by indirect heat exchanging in the convection section of the fired steam reformer.

Alternatively, prior to mixing the sulfur-free ammonia stream obtained by conducting the process of claim 1 or 2 with a hydrocarbon feedstock, part of said sulfur-free ammonia stream is passed through an ammonia cracking stage to form a hydrogen rich stream and said stream is then combined with the hydrogen rich stream from the reforming stage or the water gas shift conversion stage prior to the final hydrogen purification.

The final purification stage of step (iv) is preferably conducted by Pressure Swing Adsorption (PSA) in one or more PSA-units, where a hydrogen recovery of about 90% may be obtained. The PSA enables that stages like low temperature shift, carbon dioxide removal and methanation be omitted.

BRIEF DESCRIPTION OF THE DRAWING

The sole FIGURE shows a schematic of a plant layout for the production of hydrogen according to a particular embodiment of the invention including the absorption/chemisorption of sulfur of an ammonia stream from an HDN unit and steam reforming for the preparation of synthesis gas for the production of hydrogen.

DETAILED DESCRIPTION OF THE PREFERRED EMBODIMENT

In the FIGURE a dry stream 1 of ammonia from an HDN-unit of a catalytic refinery-process in close proximity and containing 2-3 ppm wt organic sulfur and up to 3 ppm wt hydrogen sulfide is admixed with a hydrogen stream 2, which may be a hydrogen recycle stream 40 divided from a final hydrogen product stream 36. The combined stream 3 is indirectly heated to about 350° C. with saturated steam in heat exchangers 4 and 5 and enters subsequently at a pressure of about 3.5 MPa to the top of sulfur absorber 6 containing a fixed bed 7 of methanation catalyst. The methanation catalyst is in the form of extruded rings of size 5×2.5 mm (OD×ID) with a nickel content in oxidized form above 23 wt % and with alumina as the carrier material. The catalyst is commercially available by Haldor Topsøe A/S under the trade name PK-7R. The sulfur of the ammonia stream is absorbed/chemisorbed on the nickel of the methanation catalyst and is able to completely remove the sulfur. The catalyst is able to remove hydrogen sulfide as well as organic sulfur compounds. The sulfur-free ammonia stream 8 leaves the absorber 6 at about 345° C. and 3.4 MPa and is subsequently mixed with a hydrocarbon feedstock 21.

Separate streams of natural gas 9, refinery gas 10 and pentane 11 are combined into single hydrocarbon feedstock 12. Said feedstock is preheated to about 370° C. by indirect heat exchange with saturated steam in exchanger and feed preheater 13. The hydrocarbon feedstock 12 is then passed to hydrotreating unit 14 and sulfur absorber 15 in order to remove hydrogen sulfide or any organic sulfur from the hydrocarbon feedstock. The desulfurized stream 16 leaves the sulfur absorber 15 at 355° C. and 3.7 MPa and is admixed with steam 17 at mixing point 18 and it is then heated by indirect heat exchange with the flue gas of the convection section 19 of fired steam reformer 20. The resulting preheated stream 21 having a temperature of 490° C. and pressure of 3.3 MPa is passed through an adiabatic performer 22, where the exiting gas 23 containing the hydrocarbon stock (which is partly converted in the adiabatic prereformer) leaves at about 470° C. and is then mixed with the sulfur-free ammonia stream 8 to form a mixed stream 24. The mixed stream 24 is heated by indirect heat exchange with the flue gas of the convection section 19 of fired steam reformer 20. The mixed stream 24 now at 600° C. and 3.2 MPa is passed through the fired steam reformer 20, where it is converted into a stream of synthesis gas 25 having about 70 vol % of hydrogen, as well as lesser amounts of carbon monoxide, carbon dioxide and methane. The synthesis gas stream 25 leaves the fired steam reformer at about 875° C. and 3 MPa of pressure is cooled by heat exchangers 26 and 27 to about 410° C. and is passed through a medium temperature shift converter 28 containing a fixed bed of shift catalyst 29. In converter 28 the synthesis gas is further enriched in hydrogen resulting in stream 30 with temperature of 310° C. and having about 73% hydrogen. The enriched hydrogen stream 30 is further cooled by heat exchangers 31, 32 and 33 before it passes through a series of process condensate separators 34, 35. From the top of separator 35 the hydrogen rich stream 36 is passed through PSA (pressure swing adsorption) units 37 for final purification of the hydrogen rich stream finally producing a purified hydrogen product stream 38 having 99 vol % hydrogen or more. Hydrogen product stream 38 is compressed by compressor 39 and if desired part of the produced hydrogen may be used as hydrogen recycle 40 to be admixed with the ammonia stream containing sulfur prior to sulfur absorption in absorber 6.

EXAMPLE

Analysis of three samples from the upper 17% of a fixed bed of sulfur absorbent in the sulfur absorber reveals strong sulfur absorption: the top sample shows a sulfur content of 6920 ppm, the middle sample 3480 ppm and the bottom sample 890 ppm. The samples correspond to a methanation catalyst under the trade name PK-7R consisting of extrude rings of size 5×2.5 mm (OD×ID) and having a nickel content in reduced form of above 23 wt % with the balance being alumina. The resulting sulfur-free ammonia stream contains only traces (order of ppb) of sulfur. X-ray Powder Diffraction (XRPD) analysis of the samples shows that in an ammonia-rich atmosphere there is no growth of the nickel crystals in the catalyst. The nickel is thus stable; it is not subjected to chemical changes and maintains a high surface area as it is dispersed throughout the carrier material.

The invention claimed is:

1. Process for removal of organic and/or inorganic sulfur from an ammonia stream comprising:
   passing an ammonia stream through a fixed bed of sulfur absorbent in a sulfur absorber, wherein said sulfur absorbent is a catalyst having a total nickel content in reduced form in the range of 10 to 70 wt % with the balance being a promoter which is one or more oxides selected from the group consisting of cerium, praseodymium, neodymium, promethium, samarium and mixtures thereof and a carrier material, wherein the carrier material is selected from the group consisting of alumina, magnesium alumina spinel, silica, titania, magnesia, zirconia and mixtures thereof; and
   withdrawing a sulfur-free ammonia stream.

2. Process according to claim 1, wherein the catalyst has a total nickel content in reduced form of above 20 wt % with the balance being alumina as the carrier material.

3. Process according to claim 1, wherein the promoted catalyst has a composition in oxidized form of above 20 wt % total nickel in reduced form and above 5 wt % promoter with the balance being alumina as the carrier material.

4. Process according to claim 1, wherein the sulfur absorber is a pre-reforming unit and the sulfur absorbent is a pre-reforming catalyst having a total nickel content in reduced form in the range 20 to 30 wt %, alumina content in the range 10 to 15 wt % with the balance being magnesia.

5. Process according to claim 1, wherein the catalyst is a methanation catalyst that has a total nickel content in reduced form of above 20 wt % with the balance being alumina as the carrier material.

6. Process according to claim 1, wherein absorption of sulphur is conducted at a temperature in the range of 100 to 650° C. and pressure in the range of 0.5 to 10 MPa.

7. Process according to claim 1, wherein said ammonia stream is separated from the effluent stream of a hydrodenitrogenation (HDN) unit.

8. Process for removal of organic and/or inorganic sulfur from an ammonia stream by passing said stream through a fixed bed of sulfur absorbent in a sulfur absorber and withdrawing a sulfur-free ammonia stream, wherein said sulfur absorbent is a catalyst having a total nickel content in reduced form in the range 10 to 70 wt % with the balance being a carrier material selected from the group consisting of alumina, magnesium alumina spinel, silica, titania, magnesia, zirconia and mixtures thereof, wherein prior to passing said ammonia stream through the fixed bed of sulphur absorbent said stream is admixed with a hydrogen stream.

9. Process according to claim 8, wherein the molar ratio of hydrogen to ammonia in said ammonia stream after admixing with hydrogen is in the range of 0.001 to 1.

10. Process for the production of hydrogen comprising:
    (i) mixing a sulfur-free ammonia stream with a hydrocarbon feedstock to form a mixed stream, the sulfur-free ammonia stream being obtained by passing an ammonia stream through a fixed bed of sulfur absorbent in a sulfur absorber, wherein said sulfur absorbent is a catalyst having a total nickel content in reduced form in the range of 10 to 70 wt % with the balance being a carrier material selected from the group consisting of alumina, magnesium alumina spinel, silica, titania, magnesia, zirconia and mixtures thereof;
    (ii) passing said mixed stream through a reforming stage and withdrawing a hydrogen-rich synthesis gas;
    (iii) passing said hydrogen-rich synthesis gas through a water-gas-shift conversion stage for further enrichment in hydrogen and withdrawing an enriched hydrogen stream; and
    (iv) passing said enriched hydrogen stream through a hydrogen purification stage and withdrawing a purified hydrogen product.

11. Process according to claim 10, wherein said ammonia stream is a stream separated from an effluent of a hydrodenitrogenation (HDN) unit.

12. Process according to claim 10, wherein the hydrocarbon feedstock of step (i) is passed through an adiabatic pre-reforming stage prior to mixing with said sulfur-free ammonia stream.

13. Process according to claim 10, wherein the reforming stage of step (ii) is selected from the group consisting of fired steam reforming, autothermal reforming and convection reforming.

14. Process according to claim 10, wherein prior to mixing the sulfur-free ammonia stream with a hydrocarbon feedstock, part of said sulfur-free ammonia stream is passed through an ammonia cracking stage to form a hydrogen rich stream and said stream is then combined with the hydrogen rich stream from the reforming stage or the water gas shift conversion stage prior to the final hydrogen purification.

15. Process according to claim 10, wherein the final purification stage of step (iv) is conducted in one or more PSA-units.

* * * * *